(12) United States Patent
Shiraishi et al.

(10) Patent No.: US 7,452,198 B2
(45) Date of Patent: Nov. 18, 2008

(54) CONTROLLER OF INJECTION MOLDING MACHINE

(75) Inventors: Wataru Shiraishi, Yamanashi (JP);
Toshio Ishikuro, Yamanashi (JP);
Satoshi Takatsugi, Yamanashi (JP);
Tatsuhiro Uchiyama, Gotenba (JP);
Hiroshi Watanabe, Fujiyoshida (JP);
Tatsuya Kawasaki, Yamanashi (JP);
Junpei Maruyama, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 143 days.

(21) Appl. No.: 11/709,213

(22) Filed: Feb. 22, 2007

(65) Prior Publication Data
US 2007/0196530 A1    Aug. 23, 2007

(30) Foreign Application Priority Data
Feb. 22, 2006   (JP)   ............................ 2006-045390
Aug. 31, 2006   (JP)   ............................ 2006-235711

(51) Int. Cl.
*B29C 45/77*   (2006.01)
(52) U.S. Cl. ..................................... 425/145; 425/577
(58) Field of Classification Search ................. 425/145, 425/557
See application file for complete search history.

(56) References Cited

U.S. PATENT DOCUMENTS 2,485,523 A * 10/1949 Ashbaugh .................... 425/145
5,002,717 A   3/1991 Taniguchi
5,030,395 A * 7/1991 Kamiguchi et al. ......... 425/145
5,129,808 A * 7/1992 Watanabe et al. ........... 425/145

(Continued)

FOREIGN PATENT DOCUMENTS

EP   1418040   5/2004

(Continued)

OTHER PUBLICATIONS

Extended European Search Report issued in corresponding European Patent Application No. 07250720.5—1253, May 22, 2007.

(Continued)

*Primary Examiner*—Tim Heitbrink
(74) *Attorney, Agent, or Firm*—Staas & Halsey LLP

(57) ABSTRACT

A controller for an injection molding machine capable of reducing an extension of a cycle time in a screw retreat process after the end of measurement, obtaining a more accurate and uniform measured resin amount, and determining measurement conditions in a short period of time. After the measurement is finished, the screw is stopped from rotating and retreated at a first speed V1. The screw is reversely rotated at a predetermined speed Rv in a set zone. As this is done, the screw is retreated at a second speed V2 lower than the first speed V1. After the reverse rotation zone is terminated, the screw is stopped from rotating and retreated at a third speed V3 to a set retreat stop position. By doing this, the cycle time can be made shorter than in the case where the retreat and reverse rotation of the screw are performed separately. Since the retreating speed of the screw is low while the screw is being reversely rotated, a sudden pressure change can be suppressed, so that precise measurement can be made. Since conditions for the reverse rotation and retreat of the screw can be regulated independently, they can be adjusted to optimum conditions in a short period of time.

16 Claims, 4 Drawing Sheets

U.S. PATENT DOCUMENTS

| | | | |
|---|---|---|---|
| 5,757,037 A | | 5/1998 | Piccone et al. |
| 5,997,778 A | * | 12/1999 | Bulgrin ..................... 264/40.1 |
| 6,149,418 A | * | 11/2000 | O'Bryan ..................... 425/145 |
| 6,371,748 B1 | * | 4/2002 | Hara ......................... 425/145 |
| 6,562,261 B2 | * | 5/2003 | Onishi ....................... 425/145 |
| 6,663,804 B2 | * | 12/2003 | Sato et al. .................. 425/145 |
| 6,962,491 B2 | * | 11/2005 | Nishizawa et al. .......... 425/145 |
| 7,125,232 B2 | | 10/2006 | Watanabe et al. |
| 2004/0096534 A1 | | 5/2004 | Shiraishi et al. |

FOREIGN PATENT DOCUMENTS

| | | |
|---|---|---|
| JP | 52-151352 | 12/1977 |
| JP | 53-39358 | 4/1978 |
| JP | 56-113440 | 9/1981 |
| JP | 61-189915 | 8/1986 |
| JP | 64-6931 | 2/1989 |
| JP | 1-26857 | 5/1989 |
| JP | 2-147312 | 6/1990 |
| JP | 2-38381 | 8/1990 |
| JP | 9-29794 | 2/1997 |
| JP | 11-240052 | 9/1999 |
| JP | 3118188 | 10/2000 |
| JP | 2001038786 | 2/2001 |
| JP | 2004-154994 | 6/2004 |
| JP | 2005035132 | 2/2005 |
| JP | 3652681 | 3/2005 |

OTHER PUBLICATIONS

Noticed of Reasons for Rejection (Office Action) in corresponding Japanese Patent Application No. 2006-235711 mailed Aug. 28, 2007.

* cited by examiner

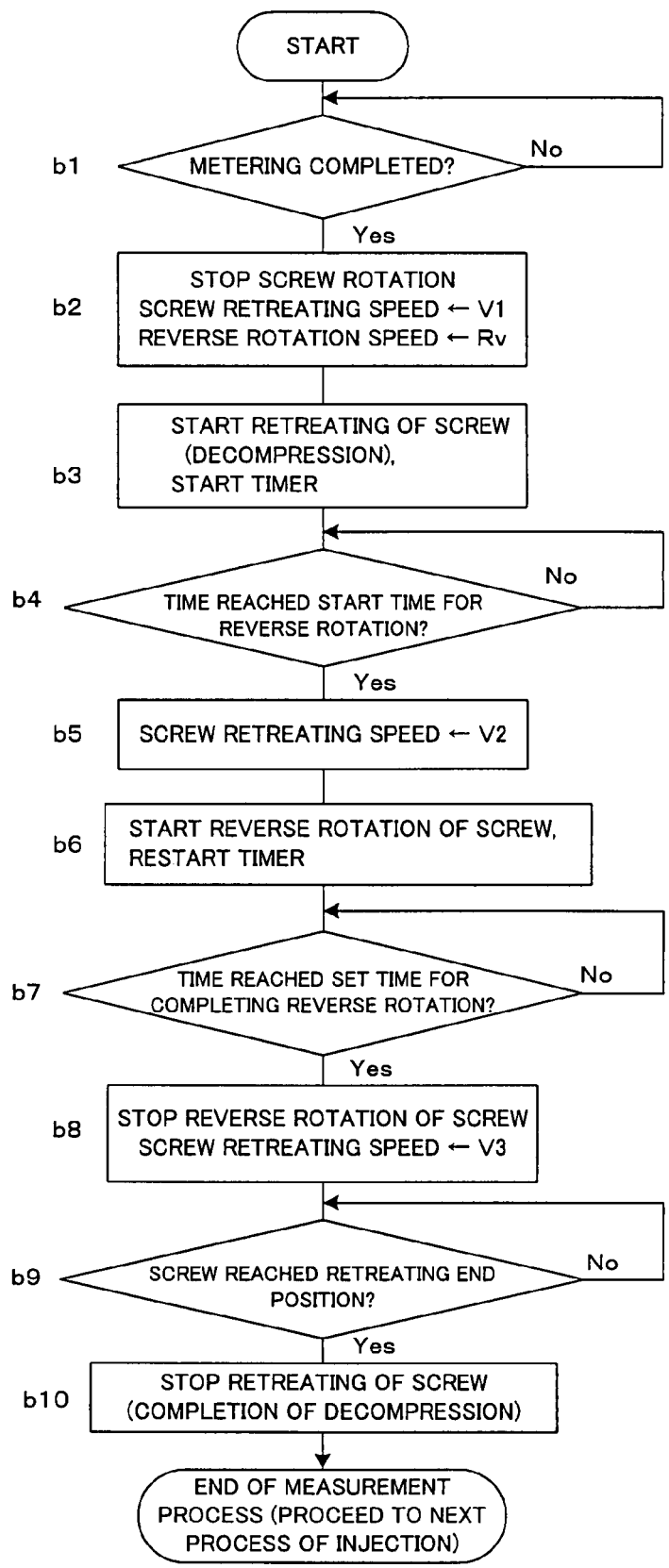

CONTROLLER OF INJECTION MOLDING MACHINE

BACKGROUND OF THE INVENTION

1. Field of the Invention

The present invention relates to an injection molding machine and more particularly to a controller of an injection molding machine for performing accurate measuring of resin.

2. Description of Related Art

In an in-line screw type injection molding machine, a screw in a heating cylinder is rotated to melt and knead a resin material, and the molten resin is fed to the distal end portion of the heating cylinder under pressure. As this is done, the screw is retreated under pressure control. When the screw reaches a set measuring point, its rotation and retreat are stopped, and the amount of the resin is measured. Likewise, in a pre-plasticization type injection molding machine, a molten resin is fed to the distal end portion of a cylinder, whereupon a plunger is retreated by the pressure of the fed resin. When the plunger reaches a set position, the amount of the resin is measured. After this measurement, the screw or the plunger is advanced to inject and fill the molten resin into a mold.

Dispersion of the fill of the molten resin in the mold should be reduced in order to improve the quality of molded products.

Injection is performed after the screw or the plunger is retreated to a measuring point or position. If the measured molten resin is directly injected and filled into the mold as this is done, an accurate fill can be obtained, so that the molded products are not subject to dispersion in weight and their quality can be kept uniform. However, there is a problem that the molten resin flows backward to change the amount of the measured resin as an injection process is started on completion of the measurement, so that an accurate amount cannot be injected.

A valve, such as a check valve or a check ring, is attached to the distal end of the screw, whereby the molten resin produced by the rotation of the screw is fed to the distal end portion of the cylinder in the measuring process, and the molten resin at the distal end portion of the screw is injected into the mold without flowing backward in the injection process. This valve prevents the molten resin from moving between the distal and proximal end portions of the screw and changing the measured resin amount during the time period from the completion of measurement to the start of injection. Thus, the measured amount of the resin can be injected accurately. However, there is a problem that the molten resin may be caused to flow backward by delayed operation of backflow preventing means, such as a valve for preventing backflow of the molten resin, so that an accurate amount of molten resin can be injected. Various techniques are proposed to improve this problem.

In a pre-plasticization type injection molding machine according to a known invention (see FIG. 1 of JP 2-147312A), a plunger is retreated on completion of measurement so that the pressure of a molten material at the distal end portion of a screw is zero. Thereafter, the plunger is advanced to retreat a check valve, thereby closing a resin passage that extends from the proximal end portion of a cylinder to the distal end portion thereof. Thus, the molten material is prevented from flowing backward, so that dispersion of the measured resin amount is removed.

In a known in-line screw type injection molding machine (see Paragraph [0031] of JP 11-240052A), a screw is stopped from rotating when it is retreated to a measuring point. After the retreat of the screw is stopped, the screw is reversely rotated in its stopped position, and the pressure of a resin at the rear end portion of a cylinder is lowered to retreat a check valve, thereby closing a resin passage. Thereafter, the resin is sucked back and injection is then started, whereby dispersion of the measured resin amount is removed.

In another known case (see Claims 1 and 2 of JP 3118188B), a screw is kept in position as it is reversely rotated in a suck-back process on completion of measurement, and injection is started thereafter. In still another known case (see Effect of the Invention of JP 2-38381B), a screw is reversely rotated and retreated at the same time on completion of measurement, and injection is started thereafter. In a further known case (see Paragraphs [0015], [0016] and [0017] of JP 9-29794B), a screw is reversely rotated after a resin is sucked back on completion of measurement, and a resin passage is closed by a ring valve. Thereafter, injection is performed after the screw is advanced to a position before the start of the suck-back process and temporarily stopped. Alternatively, injection is performed after the screw is reversely rotated as it is advanced to the position before the start of the suck-back process and temporarily stopped after the resin is sucked back. In another known case (see Claims 1 and 2 of JP 60-76321A), preliminary injection is performed after measurement in order to improve the accuracy of injection. In this preliminary injection, a pressure lower than the pressure of injection of melted oil into a cavity is maintained for a fixed period of time after measurement or so that it increases to a fixed pressure. After a check ring is closed, the position concerned is stored in memory, and injection is performed for a fixed distance from the stored position. Alternatively, a screw is reversely rotated during the preliminary injection. In another known case (see claims of JP 53-39358A), a screw is simply pressurized and advanced to and stopped at a predetermined position on completion of measurement, and injection is performed in this position as a reference point. In another conventionally known case (see claims of JP 52-151352A), a screw is subjected to a pressure for a fixed period of time such that a check valve is moved to close a resin passage securely on completion of measurement, it is stopped at a point where a predetermined pressure is reached, and injection is performed in this position as a reference point.

In an alternative case (see Paragraph [0011] of JP 3652681B), a surplus measured resin that is produced by excessive screw rotation after measurement is returned by reverse rotation. In another alternative case (see Paragraph [0011] of JP 2004-154994A), reverse rotation of a screw is started immediately before the end of measurement, and the screw is stopped at an accurate measurement end position.

According to the prior art techniques described above, backflow or the like of the molten resin at the distal end portion of the cylinder is prevented from occurring and changing the measured resin amount during injection.

In a known control method for obtaining an acute measured resin amount (see the last line of column 6 to line 21 of column 7 of JP 1-26857B), a plurality of sets of back pressure commands and screw rotational frequency commands are provided so that combinations of back pressures and screw rotational frequencies can be controlled in association with one another. In this case, the measurement is made uniform by controlling the screw rotational frequencies and screw retreating speeds to be zero at the end of a measuring process.

In another known method (see claims and FIG. 2 of JP 64-6931B), moreover, a stable measured resin amount is obtained by gradually reducing screw rotational speeds used before the stop of measurement based on screw retreat positions.

In the pre-plasticization type injection molding machine described in JP 2-147312A, the plunger is retreated or advanced after completion of measurement. In the injection molding machines described in JP 11-240052A, JP 3118188B, JP 9-29794B and JP 3652681B, moreover, an accurate measured amount (injection amount) is obtained by separately performing the reverse rotation and the advance or retreat of the screw after the end of measurement. However, the measuring operation based on these prior art techniques are disadvantageous in that its cycle time is inevitably extended, as compared with measuring operation of a pre-plasticization type injection molding machine in which the plunger is neither advanced nor retreated or a conventional in-line screw type injection molding machine in which the screw is not reversely rotated.

According to the technique described in JP 2-38381B in which the screw is reversely rotated as it is retreated after completion of measurement, moreover, the internal pressure of the screw is fully lowered if the screw is reversely rotated a little, although there is no possibility of an unfavorable extension of the cycle time. Therefore, the screw must be reversely rotated to the minimum necessary extent for precise molding, which may possibly result in excessive reverse rotation. If the screw is excessively reversely rotated, however, the molten resin is caused to flow backward and excessively filled into a groove of the screw, inevitably causing dispersion of the measurement in the next molding cycle. If the retreat distance of the screw is shortened in order to reduce the reverse rotation of the screw, moreover, decompression by the screw retreat is so small that molding is destabilized by dripping from a nozzle. If the retreating speed of the screw in reverse rotation is too high, furthermore, a pressure reducing effect of the measured resin by the reverse rotation of the screw cooperates with a pressure reducing effect of the measured resin by the screw retreat. Thereupon, a sudden pressure change occurs, so that the measured amount of the resin changes inevitably. This increases dispersion in the injection pressure or the minimum cushion amount, and its control is very difficult.

SUMMARY OF THE INVENTION

The present invention provides a controller for an injection molding machine capable of minimizing an extension of a cycle time in a screw retreat process after the end of measurement, obtaining a more accurate and uniform measured resin amount, and determining measurement conditions in a short period of time.

According to a first aspect of the present invention, a measuring method is provided for an injection molding machine of in-line screw type having a screw provided rotatable and axially movable in a cylinder. The method comprises: rotating the screw in a first direction to feed resin in front of the screw in the cylinder to perform metering of resin; and axially moving the screw in a retreating direction opposite to an advancing direction for injecting resin after the metering of resin is completed so that the screw makes a retreating motion, and rotating the screw in the retreating motion thereof in a second direction reverse to the first direction, wherein a first speed of the retreating motion of the screw while not rotated is different from a second speed of the retreating motion of the screw while rotated in the second direction.

According to a second aspect of the present invention, a measuring method is provided for an injection molding machine of pre-plasticization type having a screw provided rotatable in a first cylinder and a plunger provided axially movable in a second cylinder connected with the first cylinder. The method comprises: rotating the screw in a first direction in the first cylinder to feed resin in front of the plunger in the second cylinder to perform metering of resin; and axially moving the plunger in a retreating direction opposite to an advancing direction for injecting resin after the metering of resin is completed so that the plunger makes a retreating motion, and rotating the screw in the retreating motion thereof in a second direction reverse to the first direction, wherein a first speed of the retreating motion of the plunger while the screw is not rotated is different from a second speed of the retreating motion of the plunger while the screw is rotated in the second direction.

According to a third aspect of the present invention, a controller is provided for an injection molding machine of in-line screw type having a first motor for rotating a screw in a cylinder and a second motor for axially moving the screw in the cylinder. The controller comprises: means for driving the first motor to rotate the screw in a first direction to feed resin in front of the screw in the cylinder while driving the second motor for metering the resin until the screw is axially moved to a preset metering completion position; means for setting a distance of a retreating motion of the screw after the screw reaches the preset metering completion position, and first and second different speeds for the retreating motion of the screw; and means for driving the second motor to axially move the screw by the set distance so that the screw performs the retreating motion after the screw reaches the set metering completion position, and driving the first motor to rotate the screw in the retreating motion thereof in a second direction reverse to the first direction, wherein the second motor is driven so that the screw performs the retreating motion at the set first speed while the screw is not rotated and at the set second speed while the screw is rotated in the second direction.

According to a fourth aspect of the present invention, a controller is provided for an injection molding machine of pre-plasticization type having a first motor for rotating a screw in a first cylinder and a second motor for axially moving a plunger in a second cylinder. The controller comprises: means for driving the first motor to rotate the screw in a first direction to feed resin in front of the plunger in the second cylinder while driving the second motor for metering the resin until the plunger is axially moved to a preset metering completion position; means for setting a distance of a retreating motion of the plunger after the plunger reaches the preset metering completion position, and first and second different speeds for the retreating motion of the plunger; and means for driving the second motor to axially move the plunger by the set distance so that the plunger performs the retreating motion after the plunger reaches the set metering completion position, and driving the first motor to rotate the screw in the retreating motion of the plunger in a second direction reverse to the first direction, wherein the second motor is driven so that the plunger performs the retreating motion at the set first speed while the screw is not rotated and at the set second speed while the screw is rotated in the second direction.

The screw may be rotated for a predetermined time period, by a predetermined angle, until the screw or the plunger reaches a predetermined position, or until resin pressure in the cylinder reaches a predetermined value in the retreating motion of the screw or the plunger.

The rotation of the screw may be started after the screw or plunger reaches a predetermined position in the retreating motion, after a predetermined time period elapsed from a start of the retreating motion, or after resin pressure in the cylinder reaches a predetermined value in the retreating motion of the screw or the plunger.

The second speed of the retreating motion of the screw or the plunger is lower than the first speed of the retreating motion of the screw or the plunger.

The first speed of the retreating motion of the screw or the plunger is controlled based on a predetermined pressure and a detected pressure of resin. Also, the second speed of the retreating motion of the screw or the plunger may be controlled based on a predetermined pressure and a detected pressure of resin.

The retreating motion of the screw or the plunger while the screw is not rotated may have a stage before the rotation of the screw is started and a stage after the rotation of the screw is completed, and speeds of the retreating motion of the screw or the plunger at the stages and the second speed may be set to have different values.

The rotation of the screw in the second direction may be stopped simultaneously with completion of the retreating motion of the screw or the plunger when the rotation of the screw is not completed before the completion of the retreating motion of the screw or the plunger.

The controller may further comprise means for axially moving the screw or the plunger in the advancing direction before starting an injection process and after completing the retreating motion of the screw or the plunger, until resin pressure in the cylinder reaches a predetermined value or the screw or the plunger reaches a predetermined position, or for a predetermined time period, and rotating the screw in the second direction in the advancing motion of the screw or the plunger, or thereafter rotating the screw in the second direction.

Since the screw is retreated continually, the cycle time can be made shorter than in the case where the retreat and reverse rotation of the screw are performed separately. Further, a sudden pressure change can be suppressed to enable precise measurement by lowering the retreating speed of the screw or operating the screw at the retreating speed under pressure control while the screw is being reversely rotated. Since conditions for the reverse rotation and retreat of the screw can be regulated independently, they can be adjusted to optimum conditions in a short period of time. After the screw is reversely rotated, moreover, the screw retreating speed can be increased again to shorten the cycle time. If the controller is designed so that only two speeds at which the screw is retreated while in reverse rotation and not in reverse rotation can be set, furthermore, the number of set items can be reduced, so that the optimum conditions can be set more easily.

BRIEF DESCRIPTION OF THE DRAWINGS

FIG. 5 is a flowchart showing decompression processing in which a reverse rotation zone is determined by time.

DETAILED DESCRIPTION

Figure 1:
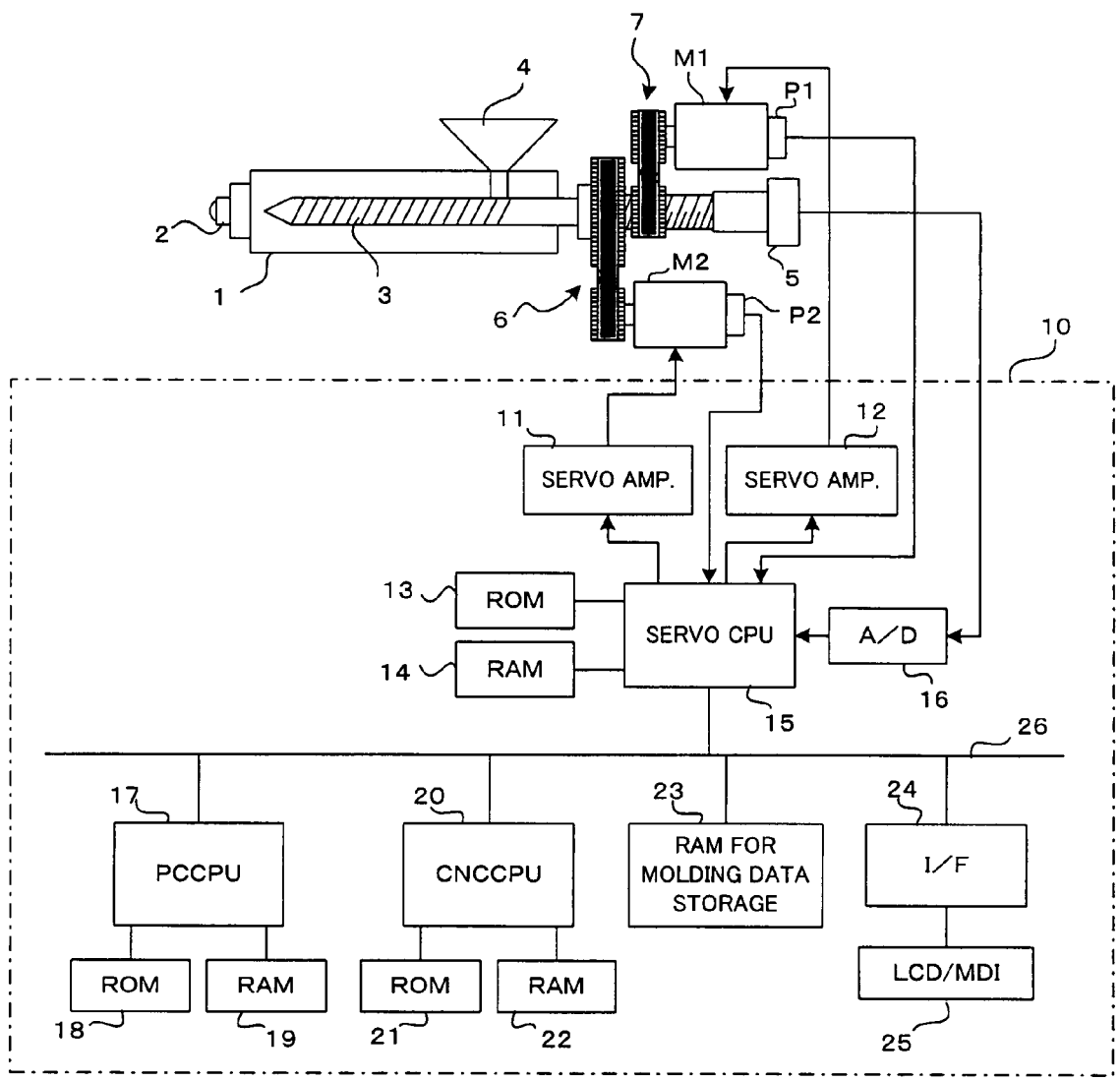
FIG. 1 is a block diagram showing principal parts of a controller for controlling an injection molding machine of in-line screw type according to one embodiment of the present invention.

FIG. 1 shows principal parts of an injection molding machine according to one embodiment of the invention. A nozzle portion 2 is attached to the distal end of an injection cylinder 1, and a screw 3 is passed through the injection cylinder 1. The screw 3 is provided with a pressure sensor 5, such as a load cell, for detecting a resin pressure from a pressure that acts on the screw 3. The screw 3 is rotated by a servomotor M2 for screw rotation through a transmission mechanism 6, which is composed of pulleys, a belt, etc. Further, the screw 3 is driven to move in its axial direction by a servomotor M1 for screw advance and retreat through a transmission mechanism 7, which includes pulleys, a belt, a ball screw/nut mechanism, and some other mechanism for converting a rotary motion into a linear motion. Symbol P1 designates a position/speed detector, which detects an axial-position and speed of the screw 3 by detecting the position/speed of the servomotor M1 for screw advance and retreat. Symbol P2 designates a position/speed detector, which detects a rotational position/speed of the screw 3 by detecting the position/speed of the servomotor M2. Further, symbol 4 designates a hopper from which a resin is supplied to the injection cylinder 1.

A controller 10 of the injection molding machine has a CNCCPU 20 as a microprocessor for numerical control, a PCCPU 17 as a microprocessor for a programmable controller, and a servo CPU 15 as a microprocessor for servo control. Information can be transferred between the microprocessors by selecting their respective inputs and outputs through a bus 26.

The servo CPU 15 is connected with a ROM 13, which is loaded with a dedicated control program for servo control for processing a position loop, speed loop, and current loop, and a RAM 14 used for temporary storage of data. Further, the servo CPU 15 is connected so that it can detect a pressure signal from the pressure sensor 5 through and A/D (analog/digital) converter 16. The pressure sensor 5, which is provided on the injection molding machine body side, detects various pressures such as an injection pressure. Furthermore, the servo CPU 15 is connected with servo amplifiers 12 and 11 that drive the servomotors M1 and M2 for injection and screw rotation, which are connected to an injection axis and a screw rotation axis, respectively, in response to a command from the servo CPU 15. Outputs from the position-speed detectors P1 and P2 that are attached to the servomotors M1 and M2, respectively, are fed back to the servo CPU 15. The respective rotational positions of the servomotors M1 and M2 are calculated by the servo CPU 15 based on position feedback signals from the position-speed detectors P1 and P2, updated, and stored in present position storage registers. In FIG. 1 shows only the servomotors M1 and M2 that drive the injection axis and the screw rotation axis, the position-speed detectors P1 and P2 that detect the respective rotational positions and speeds of the servomotors M1 and M2, and the servo amplifiers 12 and 11. However, various other axes, such as a mold clamping axis for mold clamping, an ejector axis for taking out a molded product from a mold, etc., are all arranged in the same manner, and they are not shown in FIG. 1.

The PCCPU 17 is connected with a ROM 18, which is stored with a sequence program for controlling the sequence operation of the injection molding machine, etc., and a RAM 19 used for temporary storage of calculation data and the like. The CNCCPU 20 is connected with a ROM 21, which is stored with an automatic operation program for generally controlling the injection molding machine, a post-measurement decompression control program related to the present invention, etc., and a RAM 22 used for temporary storage of calculation data and the like.

A RAM 23 for molding data storage, which is composed of a nonvolatile memory, is a molding data reservation memory that stores molding conditions and various set values, parameters, macro variables, etc. related to injection molding operation. An LCD (liquid crystal display)/MDI (manual data input) 25 is connected to the bus 26 through an interface (I/F) 24, whereby a graph display screen or a function menu can be selected and various data can be inputted. The LCD/MDI 25 is provided with ten-keys for numerical data input, various function keys, etc. A CRT may alternatively be used in place of the LCD as a display unit.

Based on this configuration, the PMCCPU 17 controls the sequence operation of the whole injection molding machine, and the CNCCPU 20 distributes movement commands to the servomotors for the individual axes in accordance with the operation program of the ROM 21, the molding conditions stored in the RAM 23 for data storage, etc. The servo CPU 15 performs conventional servo control, such as position loop control, speed loop control, current loop control, etc., or executes the so-called digital serve processing, thereby drivingly controlling the servomotors M1 and M2, in accordance with the movement commands distributed to the axes and the position and speed feedback signals detected by the position-speed detectors P1 and P2.

The above-described configuration of the controller is the same as that of a controller of a conventional electric injection molding machine provided that the ROM 21 is loaded with the program for decompression processing after completion of measurement.

The controller of an injection molding machine of in-line screw type has been described referring to FIG. 1. In addition, the present invention is also applicable to an injection molding machine of pre-plasticization type which has a screw for kneading/metering operation and a plunger for injection operation.

Figure 2:
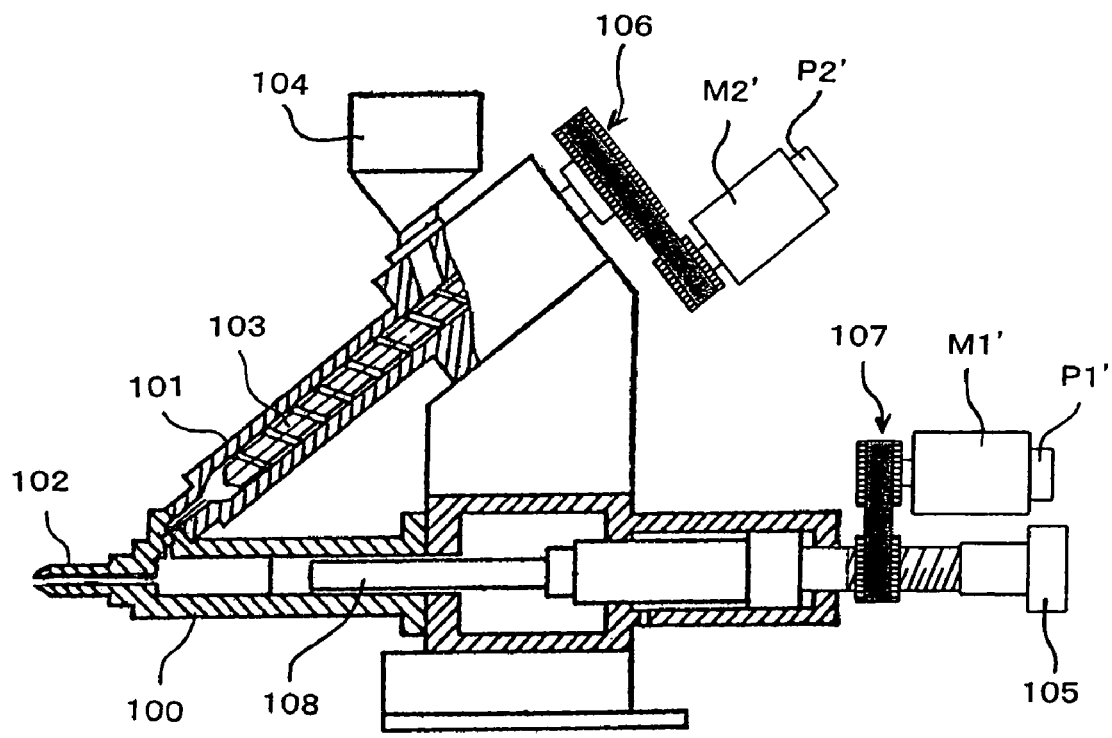
FIG. 2 is a schematic diagram of an injection molding machine of pre-plasticization type.

FIG. 2 schematically shows an injection molding machine of pre-plasticization type. A nozzle 102 is attached to a distal end of an injection cylinder 100, and a plunger 108 is provided in the injection cylinder 100. The plunger 108 is provided with a pressure sensor 105, such as a load cell, for detecting a resin pressure from a pressure that acts on the plunger 108. The plunger 108 is driven to move in its axial direction by a servomotor M1' for plunger advance and retreat through a transmission mechanism 107 which includes pulleys, a belt, a ball screw/nut mechanism, and some other mechanism for converting a rotary motion into a linear motion. A screw 103 is provided in a kneading/metering cylinder 101 which is connected with the injection cylinder 100 at a distal end thereof. The screw 103 is rotated by a servomotor M2' for screw rotation through a transmission mechanism 106, which is composed of pulleys, a belt, etc. Symbol P1' designates a position/speed detector, which detects an axial position and speed of the plunger 108 by detecting the position/speed of the servomotor M1' for plunger advance and retreat. Symbol P2' designates a position/speed detector, which detects a rotational position/speed of the screw 103 by detecting the position/speed of the servomotor M2'. Further, symbol 104 designates a hopper from which a resin is supplied to the kneading/metering cylinder 101.

In the above-described injection molding machine of pre-plasticization type, the servomotors M1' and M2', the position/speed detector P1', P2' and the pressure sensor 105 are connected to the numerical controller 10 as shown in FIG. 1 in the same manner so that the injection molding machine is controlled.

Figure 3:
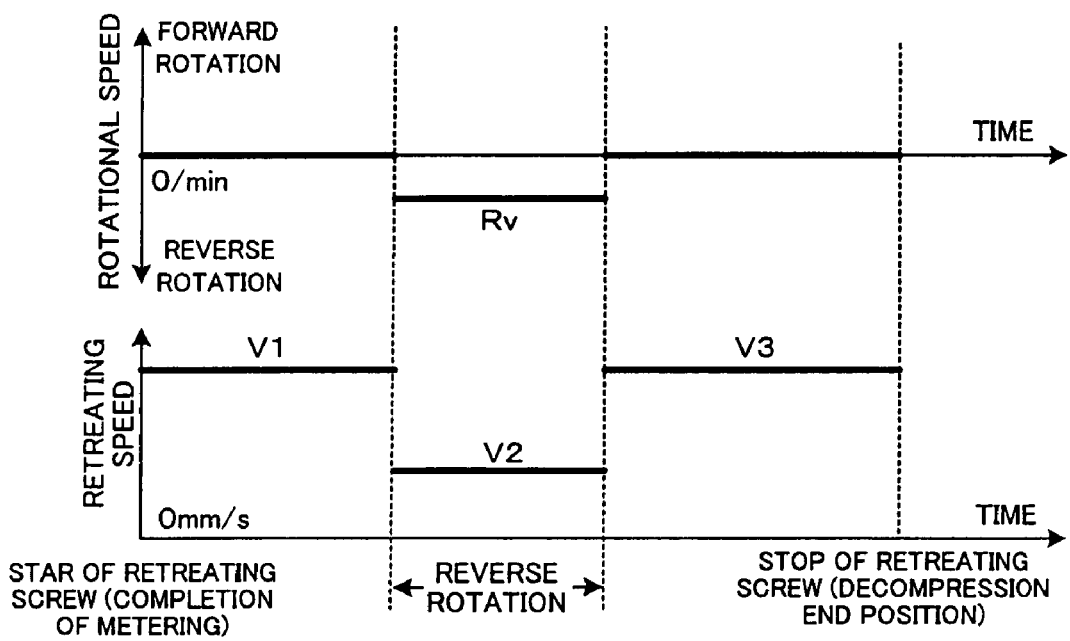
FIG. 3 is a diagram illustrating an outline of operation for decompression processing after completion of measurement according to the embodiment.

FIG. 3 is a diagram illustrating an outline of operation for the decompression processing after completion of measurement according to the present embodiment. FIG. 3 shows the decompression processing for the injection molding machine of in-line screw type. The operation for a measuring process according to the present embodiment is characterized in that the screw 3 is subjected to back pressure as it is retreated to a set metering position, as in the conventional case, and the decompression operation is performed after the metering is completed. In this decompression operation, the screw 3 is retreated to a set decompression end position and reversely rotated in some zones during the retreat. The screw 3 is forwardly rotated at the time of measurement, and the reverse rotation is reverse to this forward rotation.

As shown in FIG. 3, the screw 3 is subjected to back pressure as it is forwardly rotated to perform kneading/metering operation in the same manner as in the conventional method, and it is retreated to the set metering position. When the measurement is completed in this state, the screw 3 is retreated at a set speed V1. As this is done, the rotation of the screw 3 is "0", that is, the screw 3 is retreated at the speed V1 without being rotated. When a set reverse rotation start point is reached, thereafter, the screw 3 is reversely rotated and retreated at a speed V2 different from the retreating speed V1. When a set reverse rotation end point is reached, the reverse rotation of the screw 3 is stopped, and the screw 3 is retreated at a retreating speed V3 (which may be equal to the aforesaid retreating speed V1) different from the retreating speed V2 used during the reverse rotation. When the set decompression end position is reached, the retreat is stopped, whereupon the measuring operation is finished. In the example shown in FIG. 3, the retreating speed V2 for the reverse rotation zone is set lower than the retreating speeds V1 and V3 for the other zones for the following reason. If the retreating speed of the screw in reverse rotation is too high, a pressure reducing effect of the measured resin by the reverse rotation of the screw cooperates with a pressure reducing effect of the measured resin by the screw retreat. Thereupon, a sudden pressure change occurs, so that the measured amount of the resin changes inevitably. This increases dispersion in the injection pressure or the minimum cushion amount, and its control is very difficult. Since this situation must be prevented, however, the retreating speed for the reverse rotation zone is lowered to facilitate adjustment of the reverse rotation of the screw 3.

As described above, the measuring method of the present invention is similar to the conventional method in that the screw 3 is subjected to back pressure and forwardly rotated to knead the resin so that the screw 3 reaches the set metering position. However, the method of the invention differs from the conventional measuring method in the action of the screw 3 after the metering position is reached. After the metering position is reached by the screw 3, according to the invention, the screw 3 is retreated and reversely rotated in some zones in the middle of the retreat. In these reverse rotation zones, the screw 3 is retreated at a speed different from the speed for the other zones. In the other zones, the screw 3 is controlled to stop its rotation.

Since the screw retreat zone partially includes the reverse rotation zones, the length of the reverse rotation zones and reverse rotation speeds can be set independently and adjusted finely. Thus, excessive reverse rotation can be prevented, and decompression can be adjusted with high accuracy.

The zone(s) for the reverse rotation of the screw may be one or more in number and may be provided immediately after the start of the screw retreat or immediately before the stoppage of the retreat.

The reverse rotation start point is settled in accordance with the retreat position of the screw, the time elapsed since the start of the screw retreat, or the resin pressure (pressure on the screw). Further, the reverse rotation end point in the reverse rotation zone is settled in accordance with the retreat position of the screw, the time elapsed since the start of the reverse rotation, the resin pressure (pressure on the screw), and the angle of rotation since the start of the reverse rotation of the screw.

The retreating speeds V1, V2 and V3 of the screw may be set in advance or obtained from an actually detected pressure and a target pressure set based on the resin pressure (pressure on the screw). For example, the retreating speeds V1, V2 and V3 of the screw may be controlled based on the difference between the target pressure and the detected pressure.

Figure 4:
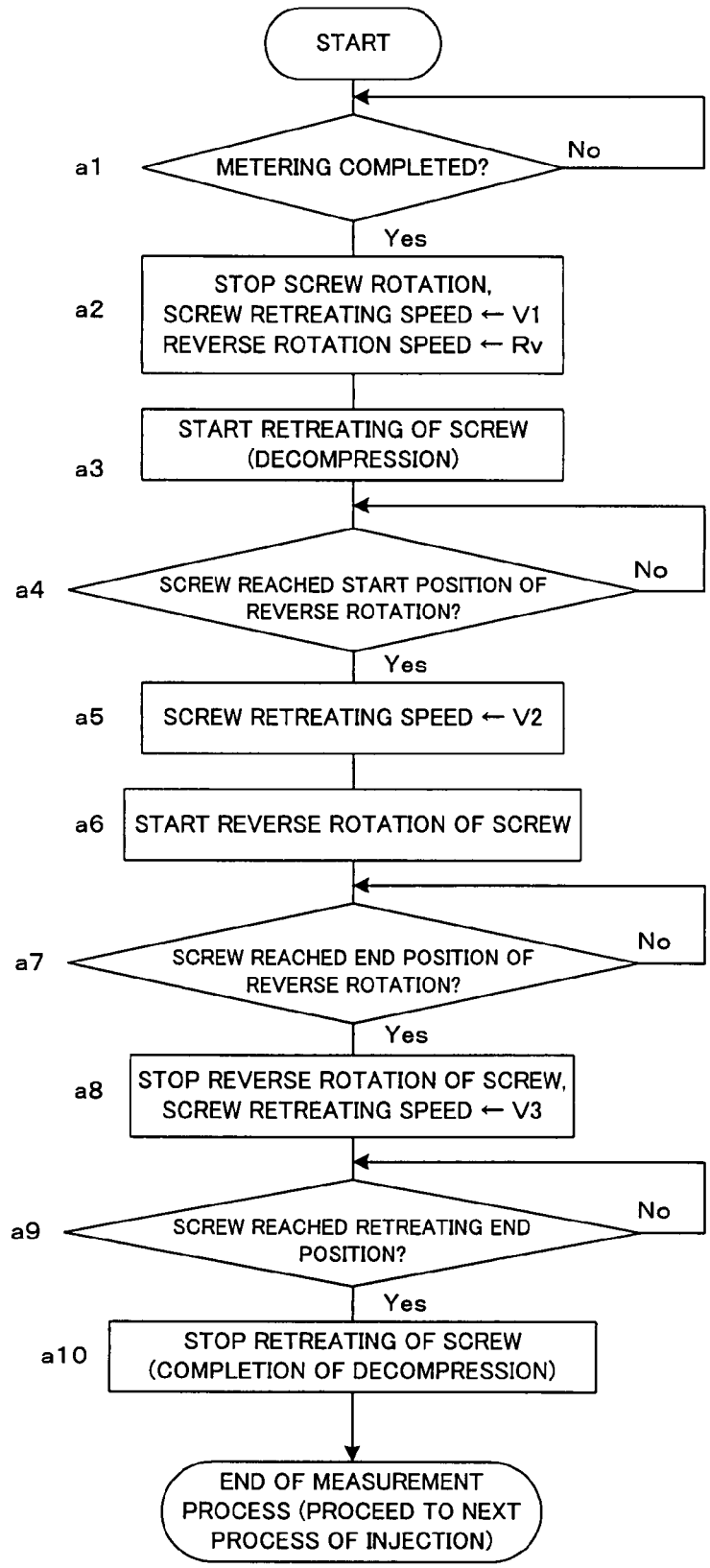
FIG. 4 is a flowchart showing decompression processing according to the embodiment.

FIG. 4 is a flowchart showing an algorithm of the decompression processing in the measuring method carried out by the CNCCPU 20 of the present embodiment.

In the example shown in FIG. 4, control is made based on a pattern such as the one shown in FIG. 3. The start and end points of the reverse rotation zone of the screw and a retreat stop point (decompression end point) are set in the retreat position of the screw, and the retreating speeds V1, V2 and V3 are also set. Further, a reverse rotation speed Rv of the screw for the reverse rotation zone is also set in advance.

The kneading/metering operation in the metering process is performed in the conventional manner and the screw 3 is retreated. When the screw 3 reaches an end point of metering of resin (Step a1), the CNCCPU 20 outputs a rotation stop command for the screw 3 to the servo CPU 15. Thereupon, the servo CPU 15 stops the rotation of the servomotor M2 for screw rotation. Further, the retreating speed V1 for the first set zone and the reverse rotation speed Rv are read (Step a2). Then, the screw 3 is retreated at the read screw retreating speed V1 (Step a3). Specifically, the CNCCPU 20 delivers a command for the movement a the screw retreating speed V1 to the servo CPU 15, whereupon the servo CPU 15 feedback-controls the servomotor M1 for screw advance and retreat so as to retreat the screw at the commanded retreating speed V1.

The screw 3 is retreated at the set retreating speed V1 without rotation until the set reverse rotation start position is reached by the position of the screw 3 represented by the rotational position of the servomotor M1 for screw advance and retreat, which is detected by the position-speed detector P1 and stored in the present position storage register (Step a4). If it is concluded that the reverse rotation start position is reached by the screw, the screw retreating speed V2 for the set reverse rotation zone is read and commanded, and the screw 3 is retreated at the retreating speed V2 by the servomotor M1 (Step a5). At the same time, the reverse rotation speed Rv is commanded so that the screw 3 is reversely rotated at the speed Rv by the servomotor M2 (Step a6).

Then, it is determined whether or not the axial movement position of the screw 3 detected by the position-speed detector P1 and stored in the present position storage register is coincident with the set reverse rotation end position of the screw (Step a7), and arrival at this reverse rotation end position is awaited.

If it is detected that the screw 3 is retreated to the reverse rotation end position, the rotation of the screw 3 is stopped, and the retreating speed of the screw is switched to the set retreating speed V3 (Step a8). Then, it is determined whether or not the screw is retreated to the set retreating end position (decompression end position) (Step a9). If it is concluded that the decompression end position is reached by the screw 3, the retreat of the screw is stopped (Step a10), whereupon the measuring operation is finished, and the next injection process is started.

If the completion of the reverse rotation of the screw is detected after the decisions in Steps a7 and a9 are made consecutively, the program proceeds to Step a8, whereupon the screw rotation is stopped, and the screw is retreated at the retreating speed V3. Thereafter, it is determined whether or not the decompression end position is reached by the screw position. If it is concluded that the decompression end position is reached, the rotation and retreat of the screw 3 may be stopped simultaneously.

According to the embodiment described above, the start of the reverse rotation zone in which the screw is reversely rotated is settled in accordance with the retreat position of the screw, and timing for the start of the reverse rotation is determined in Step a4. Alternatively, however, this timing may be settled by the resin pressure or the time elapsed since the start of the reverse rotation of the screw for decompression after the attainment of the metering point. If the start of the reverse rotation of the screw is settled by the elapsed time, it is necessary only that the elapsed time be set in advance, a timer be reset and started in Step a3, and it be determined whether or not a set elapsed time is reached by a time measured by the timer. These steps of procedure are shown in FIG. 5.

If the start of the reverse rotation of the screw is settled by the resin pressure, on the other hand, it is necessary only that the resin pressure on the screw 3 detected by the pressure sensor 5 be detected through the A/D converter 16, and it be determined in Step a4 whether or not a set pressure is reached by the detected pressure in terms of a screw position.

In the foregoing embodiment, moreover, the reverse rotation end position of the screw is also determined by the screw retreat position. Alternatively, however, it may be determined in accordance with the time elapsed since the start of the reverse rotation, the resin pressure, and the rotational angle of the screw 3 covered after the start of the reverse rotation. If the reverse rotation end position is determined by the elapsed time, it is necessary only that the elapsed time be set in advance, the timer be reset and started in Step a6, and it be determined in Step a7 whether or not a set elapsed time is reached by a time measured by the timer. These steps of procedure are shown in FIG. 5.

If the reverse rotation end position is determined by the resin pressure, on the other hand, it is necessary only that the resin pressure at which the reverse rotation of the screw is stopped be set in advance, and it be determined in Step a7 whether or not the set or lower pressure is reached by the resin pressure on the screw 3 detected by the pressure sensor 5. If it is concluded that the set or lower pressure is reached, the program is expected to proceed to Step a8.

If the completion of the reverse rotation zone is determined by the rotational angle of the screw, moreover, it is necessary only that the rotational angle be set in advance, the rotational position of the screw, which is detected by the position-speed detector P2 in Step a6 and stored in the present position storage register, be read and stored, and it be determined in Step a7 whether or not the set rotational angle of the screw is covered by the rotational position stored in the present position storage register.

FIG. 5 is a processing flowchart for the case where the start and end of the reverse rotation zone of the screw is determined by time. This processing differs from the processing shown in FIG. 4 in that the timer is additionally reset and started in Step b3, that it is determined in Step b4 whether or not a set start time is reached by time measured by the timer, that the timer is additionally reset and started in Step b6, and that it is determined in Step b7 whether or not a set reverse rotation end time is reached by a time measured by the timer. This processing shares other steps with the processing of FIG. 4.

According to the foregoing embodiment, the screw retreating speeds V1, V2 and V3 at which the screw is retreated for decompression are set values. Alternatively, however, these retreating speeds may be controlled based on the resin pressure.

Possibly, the target pressure is set in advance, a difference or deviation from the pressure detected by the pressure sensor 5 is obtained, and the retreating speed of the screw is controlled based on the obtained pressure deviation. For the reverse rotation zone of the screw, in this case, a gain by which the pressure deviation is multiplied should be made smaller than those for the other zones, since the retreating speed is expected to be lower than those for the other zones in order to finely adjust the influence of the reverse rotation of the screw.

Although an example of an in-line screw type injection molding machine has been described in connection with the foregoing embodiment, the present invention is also applicable to a pre-plasticization type injection molding machine that has a plunger and a screw. The rotational speed and rotational angle of the screw of the in-line screw type injection molding machine correspond to those of the screw of the pre-plasticization type injection molding machine. The axial movement of the screw of the in-line screw type corresponds to the movement of the plunger of the pre-plasticization type.

Although the cycle may be somewhat lengthened, moreover, high-accuracy injection can be ensured by an additional process for advancing the screw or the plunger in an injection direction before the injection after the retreat process so that a predetermined pressure or position is reached at a predetermined speed or for a predetermined time. In this case, a pressure hold process is started after a predetermined amount of resin is injected in the injection process based on a position reached in the additional process as a reference point for the start of injection in the injection process. The predetermined speed is a speed that is obtained from the result of preset speed or pressure control. The screw is rotated in a direction opposite to the direction for measurement during or after the process for the advance to the reference point. Thus, a preparation can be made for more precise injection. Optimum values for the predetermined pressure, position, speed, and time in the process for the advance to the reference point, which vary depending on the type of resin or other molding conditions, should be previously obtained and set by experiments or the like.

What is claimed is:

1. A controller of an injection molding machine having a first motor for rotating a screw in a cylinder and a second motor for axially moving the screw in the cylinder, said controller comprising:
   means for driving the first motor to rotate the screw in a first direction to feed resin in front of the screw in the cylinder while driving the second motor for metering the resin until the screw is axially moved to a preset metering completion position;
   means for setting a distance of a retreating motion of the screw after the screw reaches the preset metering completion position, and first and second different speeds for the retreating motion of the screw; and
   means for driving the second motor to axially move the screw by the set distance so that the screw performs the retreating motion after the screw reaches the set metering completion position, and driving the first motor to rotate the screw in the retreating motion thereof in a second direction reverse to the first direction,
   wherein the second motor is driven so that the screw performs the retreating motion at the set first speed while the screw is not rotated and at the set second speed while the screw is rotated in the second direction.

2. A controller of an injection molding machine according to claim 1, wherein the screw is rotated for a predetermined time period in the retreating motion.

3. A controller of an injection molding machine according to claim 1, wherein the screw is rotated by a predetermined angle in the retreating motion.

4. A controller of an injection molding machine according to claim 1, wherein the screw is rotated until the screw reaches a predetermined retreat position in the retreating motion.

5. A controller of an injection molding machine according to claim 1, wherein the screw is rotated in the retreating motion until resin pressure in the cylinder reaches a predetermined value.

6. A controller of an injection molding machine according to claim 1, wherein the rotation of the screw is started after the screw reaches a predetermined position in the retreating motion.

7. A controller of an injection molding machine according to claim 1, wherein the rotation of the screw is started after a predetermined time period elapsed from a start of the retreating motion of the screw.

8. A controller of an injection molding machine according to claim 1, wherein the rotation of the screw is started after resin pressure in the cylinder reaches a predetermined value in the retreating motion of the screw.

9. A controller of an injection molding machine according to claim 1, wherein the second speed of the retreating motion of the screw is lower than the first speed of the retreating motion of the screw.

10. A controller of an injection molding machine according to claim 1, wherein the first speed for the retreating motion of the screw is controlled based on a predetermined pressure and a detected pressure of resin.

11. A controller of an injection molding machine according to claim 1, wherein the second speed of the retreating motion of the screw is controlled based on a predetermined pressure and a detected pressure of resin.

12. A controller of an injection molding machine according to claim 1, wherein the retreating motion of the screw while not rotated has a stage before the rotation of the screw is started and a stage after the rotation of the screw is completed, and the controller further comprising means for setting speeds of the retreating motion of the screw at the stages and the second speed to have different values.

13. A controller of an injection molding machine according to claim 1, wherein the rotation of the screw in the second direction is stopped simultaneously with completion of the retreating motion of the screw when the rotation of the screw is not completed before the completion of the retreating motion of the screw.

14. A controller of an injection molding machine according to claim 1, further comprising means for axially moving the screw in the advancing direction before starting an injection process and after completing the retreating motion of the screw, until resin pressure in the cylinder reaches a predetermined value or the screw reaches a predetermined position, or for a predetermined time period, and rotating the screw in the second direction in the advancing motion of the screw.

15. A controller of an injection molding machine according to claim 1, further comprising means for axially moving the screw in the advancing direction before starting an injection process and after completing the retreating motion of the screw, until resin pressure in the cylinder reaches a predetermined value or the screw reaches a predetermined position, or for a predetermined time period, and then rotating the screw in the second direction.

16. A controller of an injection molding machine having a first motor for rotating a screw in a first cylinder and a second motor for axially moving a plunger in a second cylinder, said controller comprising:

means for driving the first motor to rotate the screw in a first direction to feed resin in front of the plunger in the second cylinder while driving the second motor for metering the resin until the plunger is axially moved to a preset metering completion position;

means for setting a distance of a retreating motion of the plunger after the plunger reaches the preset metering completion position, and first and second different speeds for the retreating motion of the plunger; and means for driving the second motor to axially move the plunger by the set distance so that the plunger performs the retreating motion after the plunger reaches the set metering completion position, and driving the first motor to rotate the screw in the retreating motion of the plunger in a second direction reverse to the first direction, wherein the second motor is driven so that the plunger performs the retreating motion at the set first speed while the screw is not rotated and at the set second speed while the screw is rotated in the second direction.

* * * * *